Feb. 3, 1931.  W. ENGEL  1,790,641
CONTROL SYSTEM FOR CONVEYERS
Filed April 26, 1929
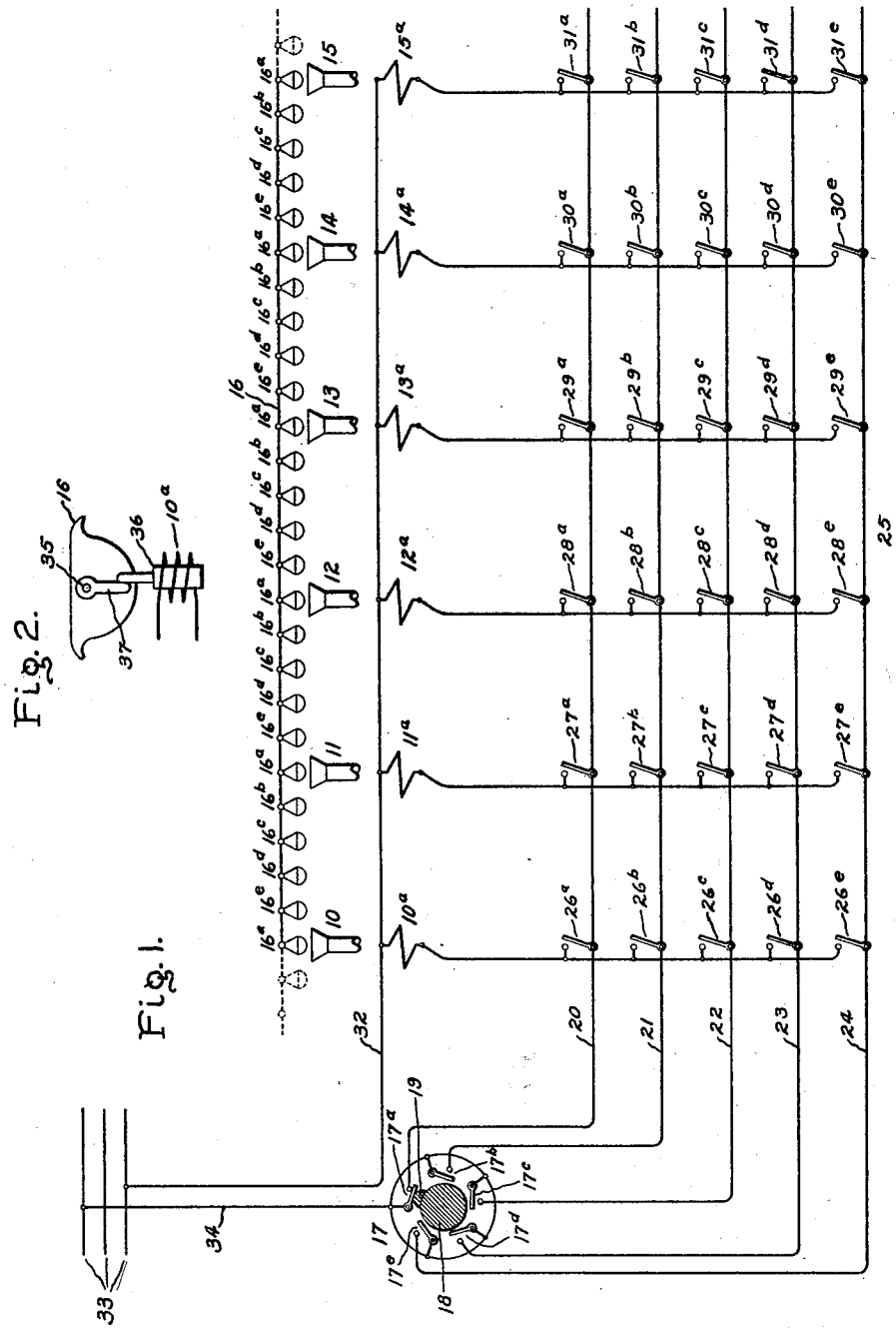
Inventor:
Walther Engel,
by Charles E. Tullar
His Attorney Patented Feb. 3, 1931

1,790,641

UNITED STATES PATENT OFFICE

WALTHER ENGEL, OF BERLIN-LICHTERFELDE, GERMANY, ASSIGNOR TO GENERAL ELECTRIC COMPANY, A CORPORATION OF NEW YORK

CONTROL SYSTEM FOR CONVEYERS

Application filed April 26, 1929, Serial No. 358,402, and in Germany May 25, 1928.

My invention relates to control means for conveyers more particularly to means for controlling the discharge or dumping of the conveyer so as to distribute the conveyed material in desired quantities to any one or more of a plurality of stations fed by the conveyer.

My invention has particular application to the coaling plants of boiler installations, mixing plants of smelting works, and other plants using continuous conveyers, such as bucket conveyers. In such installations it is desired to discharge the various conveyer members at different discharging points or stations and if some of the discharge points drop out, for instance, owing to the boiler in question being out of action, or if some of the discharge points or bunkers are to be supplied to a greater or less extent than others, means must be provided for stopping the charging at any one point and increasing it at another. The present invention provides an extraordinarily simple electrical solution by means of which the control in the supplying operations can be effected from a remote point.

In accordance with the invention means are provided at each discharge point for discharging the conveyer at that point. These discharge devices are controlled through a selective switching means and also by a cam actuated switching device which is operated by a cam disk. The cam disk is driven from the conveyer plant in such a way that it makes one revolution while one conveyer member, bucket, or the like, is traveling from one discharge point to the other, it being assumed that the discharge points are equidistant. In the path of the cam disk as many switches are provided as there are conveyer members between two discharge points. Each switch is closed once each revolution by the cam disk, and this occurs exactly at the moment the conveyer member belonging to that switch is over the discharge point. These circuits controlled by the cam actuated switches are also controlled by the selective switching means.

In the accompanying drawing, Fig. 1 is a diagrammatic representation of a conveyer plant embodying my invention, while Fig. 2 is a diagrammatic representation of the dumping mechanism.

Referring to the drawing, I have shown my invention in connection with a plant having five normal discharge points or stations 10 to 14 inclusive, and also a sixth discharge point or station 15 for reserve purposes. These discharge points are represented on the drawings by funnels or hoppers which may lead to suitable bunkers, and which receive the material, such as coal, which is conveyed to them by means of a suitable continuous conveyer 16 provided with a plurality of separably dischargeable conveyer members or sections, such as buckets, for the coal. Since there are five normal discharge points the conveyer is arranged in accordance therewith with groups of five conveyer members $16^a$, $16^b$, $16^c$, $16^d$, $16^e$, between any two points so that one conveyer member of each group belongs to each discharge point.

The dumping of the conveyer members is controlled by means of a switching device 17, which in the form shown comprises five normally open switches $17^a$ to $17^e$ inclusive, arranged in a circle and spaced apart equal distances. Concentric with the switches is a cam disk 18 driven by the conveyer or in synchronism with the conveyer. This cam disk is provided with a projection 19 which engages and closes each switch for a short interval as it passes by the switch.

From these switches $17^a$ to $17^e$, conductors 20 to 24 lead to a selective distributing table 25. The conductor 20 is connected on the table to a plurality of selective switching devices, shown as knife switches $26^a$ to $31^a$, which correspond respectively with the dumping mechanisms $10^a$ to $15^a$ for the discharge points or bunkers 10 to 15 inclusive. In a similar manner the conductors 21 to 24 inclusive, are each connected to a group of selective switching devices each group containing a switching device for each dumping mechanism.

The dumping mechanisms or devices $10^a$ to $15^a$ are shown as electromagnets. One terminal of each of the electromagnets $10^a$ to $10^e$ $15^a$ is connected to a common conductor 32 leading to one side of a supply source 33. The opposite terminals of these electromagnets are each electrically connected respectively to the groups of switches designated by the 26 to 30 series so that by closing an appropriate one or more of these switches the corresponding electromagnet may be electrically connected to any one or more of the conductors 20 to 24 inclusive. Thus the electromagnet $10^a$ is connected to the series of switches $26^a$, $26^b$, $26^c$, $26^d$, $26^e$, the electromagnet $11^a$ is connected to the series of switches $27^a$, $27^b$, $27^c$, $27^d$, $27^e$, and so on. One terminal of each of the switches $17^a$ to $17^e$ inclusive, is electrically connected through a conductor 34 to a supply main of the source 33 of opposite polarity with respect to the one to which the conductor 32 is connected.

In Fig. 2 is shown diagrammatically an operating connection which may be used between the dumping coils $10^a$ to $15^a$ and the conveyer member. Preferably the conveyer member or bucket 16 is supported on a central pivot 35 arranged near the top of the bucket so that the bucket, due to the overbalancing of its lower portion, will normally assume a horizontal upright position. As shown, the electromagnet $10^a$ is provided with an armature 36 which when the electromagnet is energized is raised into the path of a projection 37 carried by the bucket, and as the conveyer continues its movement the bucket is tilted about its pivot 35 by the engagement of projection 37 with the armature, and thereby dumped into some one of the hoppers 10 to 15, as the case may be.

The operation of the system is as follows: The cam disk 18 is shown as holding the switch $17^a$ closed and at this time the corresponding buckets $16^a$ controlled by this switch are exactly over the discharge points 10 to 15 inclusive, or in other words, in such positions that if some one of the respective dumping devices $10^a$ to $15^a$ is energized, the bucket $16^a$ at that point will be dumped into the appropriate hopper. At which of the discharge points the bucket is dumped depends upon which one of the switches $26^a$ to $31^a$ is closed. If all of the bunkers are to be fed equally then the switch $26^a$ will be closed so that the buckets $16^a$ will be dumped successively as they arrive at the discharge point 10. On further movement of the conveyer from the left toward the right, the switch $17^b$ is closed by the cam disk 18 at the moment that the next bucket $16^b$ is over the bunker 11. If now the switch $27^b$ has been closed, each bucket $16^b$ will be dumped as it arrives over the hopper 11. This method of operation applies also to the switches $17^c$, $17^d$, and $17^e$, which control the dumping of the next succeeding buckets $16^c$, $16^d$ and $16^e$ to come over the discharge points as the conveyer proceeds, the dumping of these buckets being selectively controlled by the switches $28^e$, $29^d$ and $30^e$ as will be understood from the previous description.

Every conceivable alteration of the discharge can be obtained by operating the switches on the distributing table 25. Thus, for instance, if no discharge is to take place at the discharge point 12 then all of the corresponding switches $28^a$, $28^b$, $28^c$, $28^d$, $28^e$ must be open. If all the buckets are to discharge at any one point, for instance in the bunker 13, then the switches $29^a$, $29^b$, $29^c$, $29^d$, $29^e$ corresponding to this bunker must all be closed but all other switches in the 26, 27, 28, 30 and 31 series must be open. The device may be used with either direct or alternating current.

What I claim as new and desire to secure by Letters Patent of the United States is:

1. A discharge control system for a conveyer provided with a plurality of conveyer members, comprising a discharge device located at each of a plurality of stations along the path of said conveyer, said discharge devices being normally in one position and movable from that position to a second position to discharge said conveyer members as said conveyer members arrive at said stations, and control means driven with said conveyer for selectively actuating said discharge devices so as to discharge predetermined conveyer members at predetermined stations.

2. A control system for a bucket conveyer comprising an electromagnetic dumping means for said buckets located at each of a plurality of discharge stations, a control switch driven with said conveyer for selectively energizing said dumping means as each bucket moves over said stations, and selective switching means for rendering said control switch ineffective except when predetermined buckets are in position to be discharged at predetermined stations.

3. A control system for a conveyer provided with a plurality of conveyer members, comprising means located at each of a plurality of stations movable to a position to discharge said members as they move past said stations, control means driven with said conveyer for successively actuating said discharge means to said discharge positions as said conveyer members arrive at said stations and selective means for each of said discharge means for rendering said control charge means effective to actuate said discharge means only when predetermined members are in position to be discharged at said stations.

4. The combination with a bucket conveyer provided with substantially as many buckets between discharge stations as there are discharge stations, of means at each of said stations movable to a position to dump said buckets as they move past said stations, control means driven with said conveyer for actuating said dumping means, and selective means for each of said dumping means for rendering said control means ineffective except when predetermined buckets move over said stations, whereby the buckets may be all dumped at any one station or distributed between some or all of said stations.

5. A discharge control system for a conveyer provided with a plurality of conveyer members, comprising electrically operated dumping means for said conveyer members located at each of a plurality of discharge stations along the path of said conveyer, a switching device driven with said conveyer for operating said dumping means as said conveyer members arrive at said stations, and selective switching means between said dumping means and said switching device for controlling the distribution of material between said stations.

6. The combination with a bucket conveyer, of electrically operated dumping means for said buckets located at each of a plurality of discharge stations along the path of said conveyer, said discharge stations being so situated that the number of buckets between discharge stations is equal to the number of discharge stations, a switching device in predetermined relation with said conveyer for operating said dumping means as said conveyer arrives at said stations, a selective switching means between said switching device and said dumping means for rendering said switching device ineffective except when predetermined buckets move over said stations so that said buckets may be all dumped at any one station or distributed between some or all of said stations.

In witness whereof, I have hereunto set my hand this 11th day of April, 1929.

WALTHER ENGEL.